United States Patent [19]

Luke et al.

[11] 4,198,107

[45] Apr. 15, 1980

[54] INTEGRAL BUS BAR CONTACT STAB STRUCTURE

[75] Inventors: Roger D. Luke, Norcross; John M. Rhodes, Atlanta, both of Ga.

[73] Assignee: Gould Inc., Rolling Meadows, Ill.

[21] Appl. No.: 942,625

[22] Filed: Sep. 15, 1978

[51] Int. Cl.² .............................................. H02B 1/20
[52] U.S. Cl. .................................. 339/22 B; 361/355
[58] Field of Search ........................ 339/22 B, 198 N; 361/355, 361, 363; 174/72 B

[56] References Cited

U.S. PATENT DOCUMENTS 4,002,388  1/1977  Menocal ............................. 339/22 B

*Primary Examiner*—Neil Abrams
*Attorney, Agent, or Firm*—Ostrolenk, Faber, Gerb & Soffen

[57] ABSTRACT

Plug-in stabs formed integrally with a bus bar for mechanically and electrically connecting with circuit breakers, or the like, are shaped so as to have mutually perpendicular contact plug-in elements on a single stab unit enabling the single stab unit to receive circuit breaker contacts that are oriented in mutually perpendicular directions. The single stab unit includes a forwardly extending stab in a plane perpendicular to the longitudinal axis of the bus bar and a pair of forwardly extending elongated rectangular stab sections disposed in spaced parallel planes that are perpendicular to the plane of the bus bar and parallel to the longitudinal axis thereof. Each stab section constitutes first and second stabs positioned on opposite sides of the central stab.

10 Claims, 7 Drawing Figures

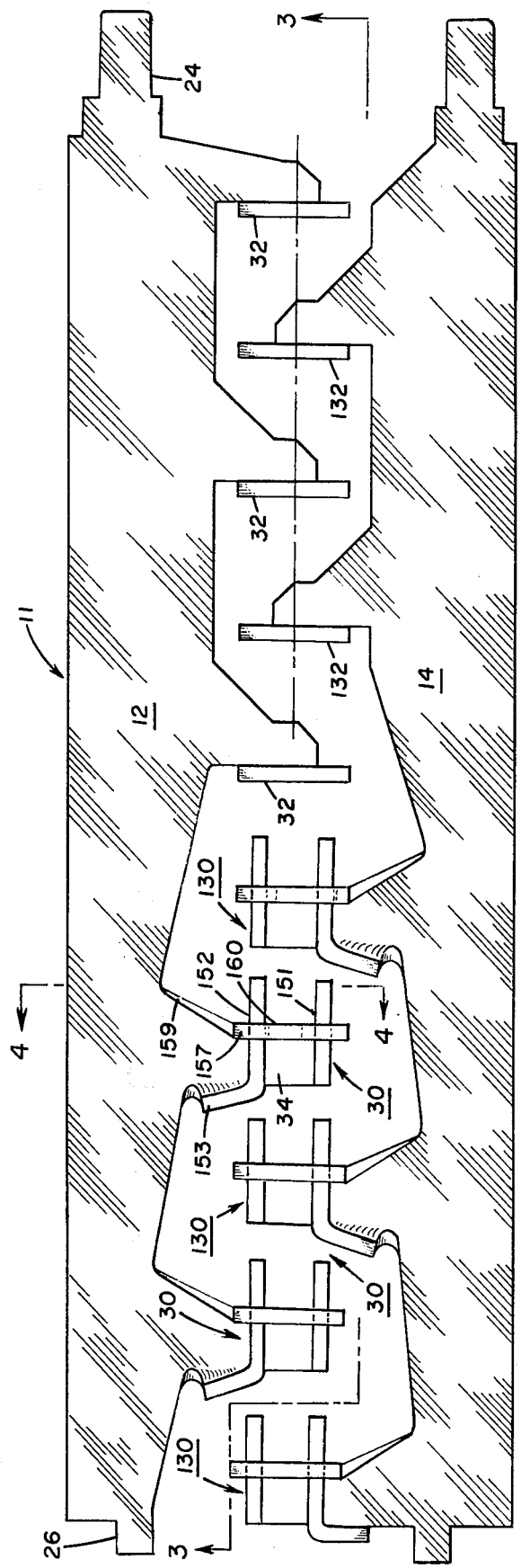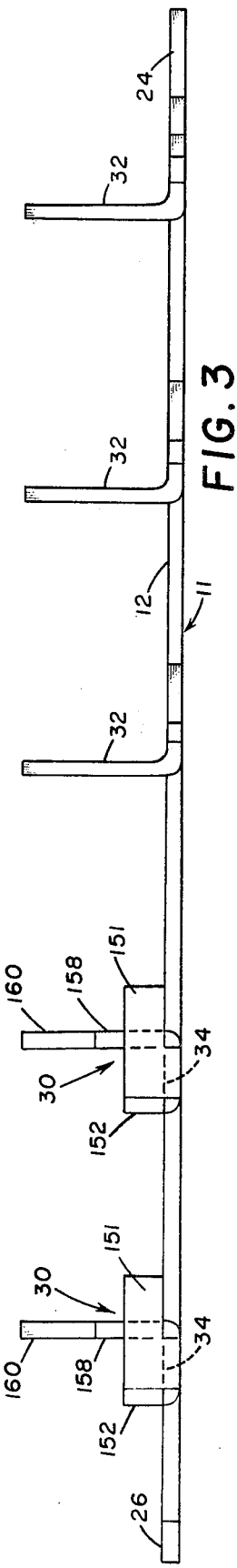

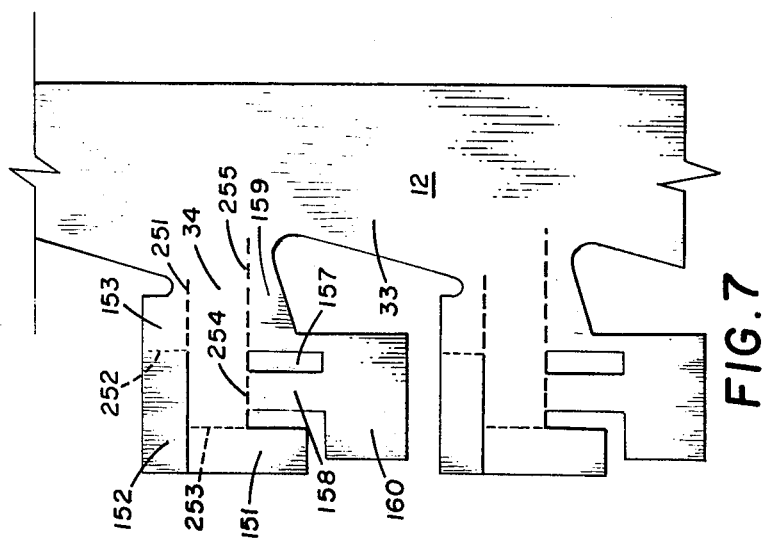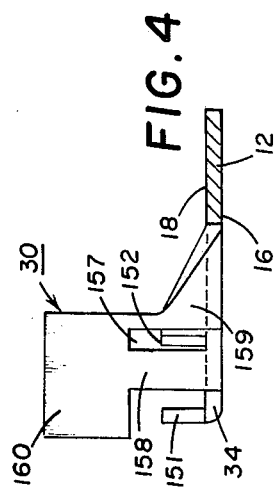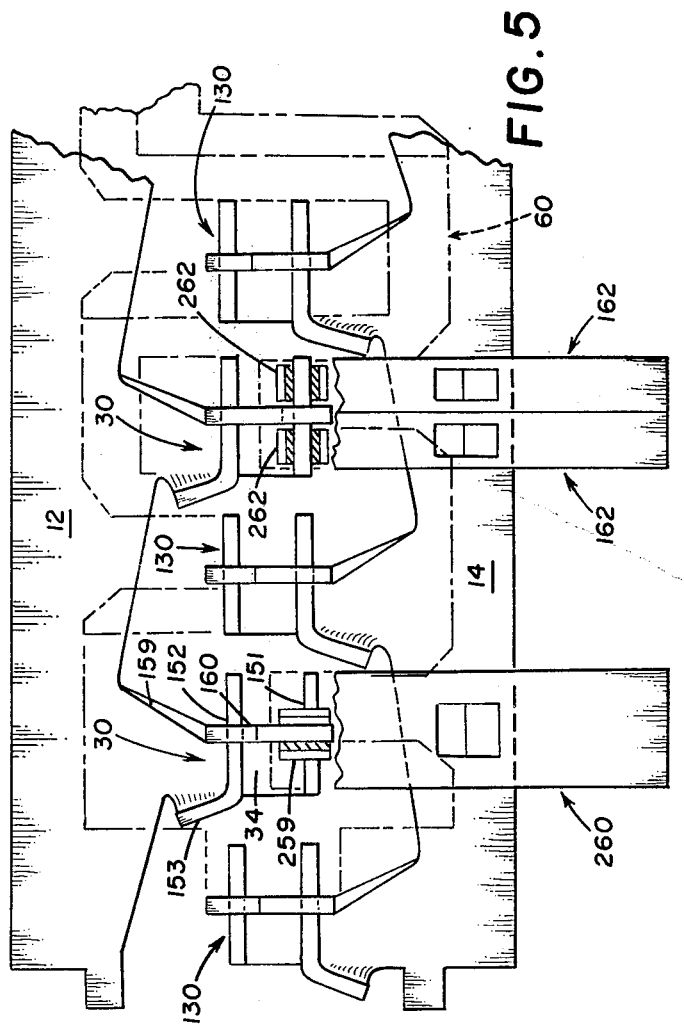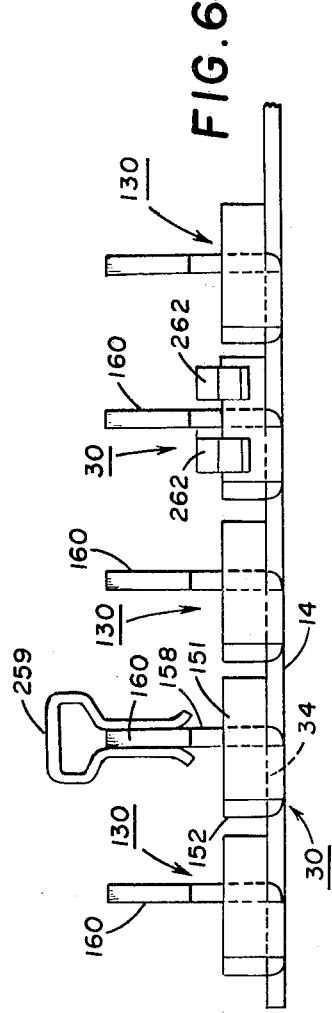

INTEGRAL BUS BAR CONTACT STAB STRUCTURE

BACKGROUND OF THE INVENTION

This invention relates to load centers for electric power distribution systems and more particularly to the bus bars and plug-in contact stabs for bus bars used in such systems. Still more particularly, this invention is an improvement over the invention disclosed in U.S. Pat. No. 4,002,388 issued Jan. 11, 1977, to G. A. Menocal entitled Stab Arrangement For Busbars.

The present invention is particularly adapted for use in a load center of the type shown in U.S. Pat. No. 3,349,292 issued Oct. 24, 1967, to James F. Meacham, and this patent is incorporated herein by reference, particularly with respect to its showing of an environment in which the present invention may be used and for its description of an arrangement of bus bars in single phase and three phase installations. See also U.S. Pat. Nos. 3,402,328 and 3,767,977.

A bus bar contact stab structure of the type adapted for the present invention comprises an elongated strip or ribbon of conductive material designated the bus bar. Projecting forward of the bus bar at spaced intervals along its longitudinal axis and laterally spaced therefrom are a plurality of stab connections to be plugged into stab receiving cooperating contacts at the line side of a circuit breaker, or the like equipment. Hereinafter, a circuit breaker is described as the equipment to be mechanically and electrically plugged onto a bus bar stab. But it should be understood that other electrical equipment having appropriate contact means may be plugged onto the stab.

A circuit breaker line contact which receives a bus bar stab may be comprised of a U-shaped clip having two arms which open outwardly of the breaker and are normally spaced apart a distance such that the stab must be forced between the arms of the clip. The clip arms are inwardly biased against the stab to make secure mechanical and electrical contact.

There are different manufacturers of circuit breakers, different sizes of circuit breakers, different styles of circuit breakers and different current ratings of circuit breakers. As a result, there are common use circuit breakers having stab receiving line contacts consisting of clip arms defining an opening between them that is oriented parallel to the long or length dimension of the circuit breaker (see U.S. Pat. Nos. 3,402,328 and 3,349,292). Other circuit breakers are available having stab receiving line contacts consisting of clip arms defining an opening between them that is oriented parallel to the narrower or width dimension of the circuit breakers (see U.S. Pat. No. 3,767,977). Furthermore, the former type circuit breakers have conventionally been placed in one inch wide casings while the latter type circuit breakers have been placed in half inch wide casings.

Commercially available panelboards having male plug-in stabs are usually constructed with bus bars having a plurality of stabs, with each stab adapted to receive only one type of circuit breaker, i.e., with its line contacts oriented in only one direction and/or where the circuit breakers have half inch wide or inch wide casings. (See U.S. Pat. No. 3,333,157 for one effort to deal with this problem.) Furthermore, each such bus bar stab is usually able to support only one circuit breaker extending away from the stab in one direction and is not able to support two neighboring circuit breakers extending in the same direction.

SUMMARY OF THE INVENTION

The invention is directed toward a bus bar contact stab structure having male stabs to be plugged into circuit breaker contacts oriented either parallel to the length or to the width dimension of the circuit breaker casing and where the circuit breakers have either one inch or half inch wide casings. Each stab unit designed in accordance with this invention includes an upstanding central stab section which projects forward, is perpendicular to the plane of the bus bar, and is oriented for being plugged into line contacts that are oriented parallel to the length dimension of a circuit breaker casing.

At each side of the central stab section are two side stabs. These side stabs project forwardly perpendicular to the plane of the bus bar and are oriented in planes perpendicular to the plane of the central stab section. Each side stab is shorter in height than the central stab and all side stabs are the same height. The side stabs are separated sufficiently such that a circuit breaker may be plugged onto any one or more of the side stabs. In fact, two half inch wide circuit breakers may be plugged in next to each other, one on a side stab at one side of the central stab and the other on a side stab at the other side of the central stab.

The aforesaid U.S. Pat. No. 4,002,388 discloses a bus bar contact stab structure constructed of a single sheet of conductive material with the stab unit and bus bar being integral. With such construction it is merely necessary to cut and bend the sheet material. There is no necessity for assembling many elements as required in prior art teachings.

While the bus bar contact stab structure of U.S. Pat. No. 4,002,388 is a vast improvement over the prior art, for higher voltage applications it is necessary to take special measures in order to maintain through air and over surface clearances. Further, direct modification of the structure in U.S. Pat. No. 4,002,388 to obtain required clearances produces a member with a number of relatively small cross-sections thereby imposing serious limitations on current ratings.

Thus, in accordance with the instant invention an improved bus bar contact stab structure is provided so as to obtain increased cross-sections for conducting elements and to obtain greater over surface and through air clearances between structures of this type when assembled in a panelboard. This is achieved by providing a connecting section extending laterally from a bus bar section and in the plane thereof. Relatively wide joining sections are bent forward from the connecting section. Side stabs for connection with half inch wide circuit breakers are at the ends of rectangular sections bent forward to be positioned in planes at right angles to the bus bar and parallel to the axis thereof. A central stab section for connection with a pair of one inch wide circuit breakers is positioned in front of the side stabs and perpendicular thereto.

When two bus bar contact stab structures constructed in accordance with the instant invention are assembled in a panelboard with the central stab sections interleaved in spaced parallel relationship there is no portion of either structure that is positioned in front of any portion of the other structure thereby facilitating maintenance of required through air and over surface clearances.

Accordingly, a primary object of the present invention is to provide an improved bus bar contact stab structure for use in load centers, or the like, and integrally constructed from a single sheet of constructive material.

Another object of the present invention is to provide a structure of this kind which provides increased through air and over surface clearances without sacrifice to current carrying characteristics.

Yet another object of the invention is to provide a structure of this type adaptable for use with different width circuit breakers.

A further object of the invention is to provide a structure of this type which is adaptable for use with circuit breaker line contacts having mutually perpendicular orientations.

A still further object of the invention is to provide a structure of this type which is economical to manufacture.

These and other objects of the invention will become apparent from the following description of the accompanying drawings.

BRIEF DESCRIPTION OF THE DRAWINGS

FIG. 2 is a plan view showing the assembled relationship of the conductive elements of FIG. 1;

FIG. 3 is a side elevation of one of the conductive elements in FIG. 2 looking in the direction of arrows 3—3 of FIG. 2;

FIG. 4 is an elevation of a contact stab structure looking in the direction of arrows 4—4 of FIG. 2;

FIG. 5 is a plan view illustrating a fragmentary portion of the assembly of elements in FIG. 1, with a combination of 1" and ½" wide circuit breakers mounted thereto;

FIG. 6 is a side view of the conducting elements of FIG. 5 showing engagement of the circuit breaker line terminals therewith; and FIG. 7 is a fragmentary plan view or development of one bus bar contact stab structure before bending thereof to place the stabs and joining sections in their final positions.

DETAILED DESCRIPTION OF THE PREFERRED EMBODIMENT

Figure 1:
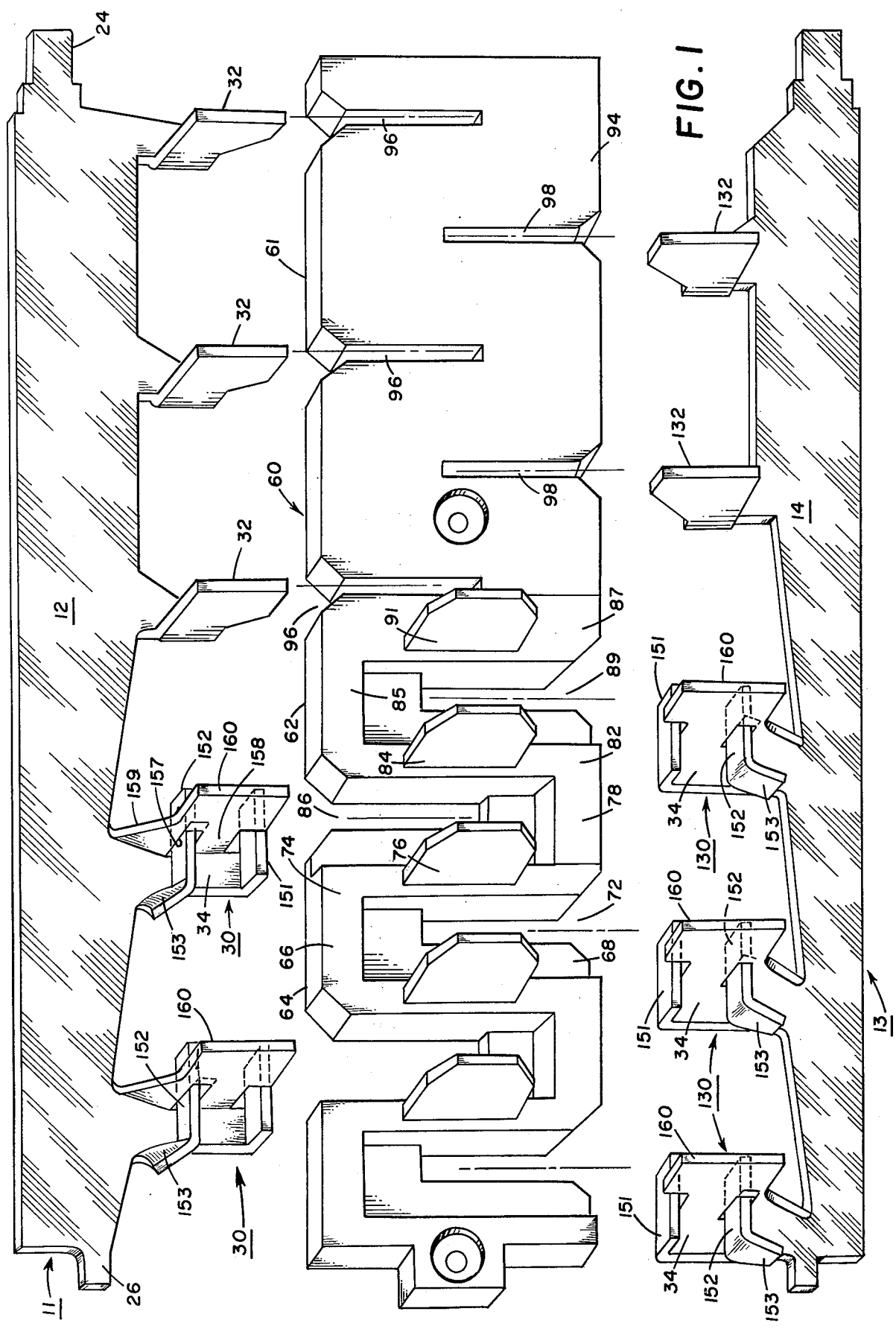
FIG. 1 is an exploded perspective showing the main elements of a single phase panelboard or load center having bus bar contact stab structures constructed in accordance with this invention.

The preferred embodiment of the present invention is adapted for use in the type of loadcenter described in U.S. Pat. No. 3,349,292, incorporated herein by reference.

More particularly, an interior assembly for a single phase loadcenter constructed in accordance with the instant invention includes a pair of bus bar contact stab structures 11, 13, of the same general construction, which are secured in position in the manner discussed in the aforesaid U.S. Pat. No. 3,349,292. The entire structure 11, including bus bar 12 and stab units 30 thereof, is integrally formed from a single sheet of conductive metal, generally copper, which is merely cut and bent to form the shaped structure 11 shown in the drawings. Between its upper or forward and lower or rear surfaces 16, 18, respectively (FIG. 4), bus bar 12 has a thickness dimension sufficient for rigidity and for effective electric current conductivity. Bus bar 12 is elongated and has terminals 24, 26 at opposite ends thereof.

Extending laterally from one side of bus bar 12 are two identical stab units 30 constructed in accordance with the instant invention. At the option of the designer of the arrangement, three stabs 32, constructed in accordance with the prior art, such as the aforesaid U.S. Pat. No. 3,349,292, are also provided. Bus bar 14 has three corresponding stab units 130, each of substantially the same construction as stab unit 30, and two prior art stab units 132. Both stab units 30, are formed from the same sheet of material as bus bar 12 cut as shown in FIG. 7 and then bent along lines 251-255 to the shapes and positions shown in the drawings. One stab unit 30 will now be described, it being understood that all other stab units 130 are of essentially the same construction as unit 30.

Elongated rectangular side stab section 151 is joined to the end of connecting section 34 remote from bus bar 12 at line 253. One end of elongated rectangular side stab section 152 is joined to connecting section 153 at line 252 and section 153 is joined to connecting section 34 at line 251. Central stab or blade 160 is connected to connecting section 34 by a joining section consisting of portions 158, 159 which are separated by elongated rectangular aperture 157. Portions 158, 159 are joined to connecting section 34 at the respective lines 254, 255. A short end of aperture 157 is disposed along lines 254, 255 which are in reality sections of a single line interrupted by aperture 157.

Erecting the flat structure of FIG. 7 to the stab unit structure 30 of FIG. 1 takes place by bending sections 151, 152 forward along the respective fold lines 253, 252 into planes at right angles to the plane of bus bar 12. Joining section 153 is then bent forward along line 251 until section 152 is adjacent the forward surface of connecting section 34. Now side stab sections 151, 152 lie in spaced parallel planes perpendicular to the plane of bus bar 12 and extending parallel to the longitudinal axis thereof.

Thereafter joining section portions 158, 159 are bent forward along line sections 254, 255 until central stab 160 lies in a plane perpendicular to the planes of bus bar 12 and side stab sections 151, 152. In the final position of stab 160, the end of stab section 152 remote from bend line 252 extends through aperture 157, central stab 160 is disposed forward of side stab sections 151, 152, and equal lengths of each section 151, 152 are disposed on opposite sides of central stab 160.

It is noted that the bends along lines 252, 253 and 254 are relatively sharp while the bends along lines 251 and 255 are each of relatively large radius, being referred to as a rolling bend.

Central stab or blade 160 is of sufficient length so that it can be plugged into the female line contact clip 259 of two of the inch wide circuit breakers 260 (FIG. 6) when they are placed end-to-end. Breaker 260 of FIG. 5 extends in front of and across bus bar 14, and outwardly of central stab section 160. Another inch wide circuit breaker (not shown) can be plugged onto central stab 160 and that breaker would extend in the opposite direction, across bus bar 12. Each of the sections 151, 152 is positioned to being engaged by the line terminals 262, 262 of two side-by-side half inch wide circuit breakers 162, (FIGS. 5 and 6). Thus, each stab unit 30 is capable of accepting four half inch wide circuit breakers, two one inch wide circuit breakers 260, or two half inch wide circuit breakers 162 in combination with a one inch wide breaker 260.

As described generally in the aforesaid U.S. Pat. No. 3,349,292, insulator assembly 60 comprises a plurality of insulator elements 61, 62, 64. Insulator 64 includes transverse leg 74 which supports upstanding insulating shield 76 disposed between adjacent stab assemblies 30 and 130. Leg 74 together with adjacent longitudinal leg 66 and transverse leg 68 of insulator element 64 define notch 72 for a stab unit 130. Leg 74 together with lengthwise leg 78 and transverse leg 82 of adjacent element 62, define notch 86 for a stab unit 30. Similarly, legs 82, 85 and 87 of insulator 62 define notch 89 for another stab unit 130. Legs 82 and 87 support the respective forwardly extending shields 84, 91.

Insulator unit 61 is somewhat different than units 62, 64, being shaped to define relatively narrow slots 96, 98 for receiving stabs 32, 132. Since spacing between stabs 32, 132 is sufficient to avoid the danger of flashover, shields similar to 76, 84 are not provided. The latter are only required between dual purpose stab units 30, 130 because the spacings between the side stab sections 152, 152 and 151, 151 of adjacent stab units 30, 130 are so short. As seen clearly in FIG. 2, bus bar contact stab structures 11, 13 are so constructed that there is no portion of one of these structures 11, 13 which is positioned in front of the other of these structures 11, 13. Further, there is a substantial spacing between structues 11, 13 so that through air and over surface distances are sufficient to prevent breakdown at voltages greater than can be handled safely by similar prior art structures of equal current rating.

Although a preferred embodiment of this invention has been described, many variations and modifications will now be apparent to those skilled in the art, and it is therefore preferred that the instant invention be limited not by the specific disclosure herein but only by the appended claims.

What is claimed is:

1. A bus bar contact stab structure formed integrally from a single sheet of conductive material, said structure including an elongated bus bar section located in a main plane and a stab unit section laterally offset from the longitudinal axis of said bus bar section, said stab unit section including first and second unitary planar stab sections extending forward of said main plane and disposed in spaced parallel first and second planes perpendicular to said main plane and parallel to said axis, said stab unit section also including a planar central stab portion extending forward of said stab sections and positioned in a third plane perpendicular to said first and second planes, each of said stab sections including first and second stabs positioned on opposite sides of said third plane.

2. A bus bar contact stab structure as set forth in claim 1 in which each of said stab sections is elongated and generally rectangular with the long edges thereof being parallel to said main plane.

3. A bus bar contact stab structure as set forth in claim 2 also including a connecting section interposed between said bus bar and said stab unit section, said first stab section being at one end of said connecting section and said second stab section extending across said connecting section and being positioned in front thereof.

4. A bus bar contact stab structure as set forth in claim 3 in which there is a first bend line at which said first stab section is connected to said connecting section, a first joining section interposed between said central stab portion and said connecting section, a second joining section interposed between said connecting section and said second stab section.

5. A bus bar contact stab structure as set forth in claim 4 in which the joining sections extend forward of the connecting section, a second bend line at which said second stab section is connected to said second joining section, said second bend line being along a short edge of said second stab section.

6. A bus bar contact stab structure as set forth in claim 5 in which the second stab section extends through an aperture in said first joining section.

7. A bus bar contact stab structure as set forth in claim 6 in which there are relatively sharp bends along the first and second bend lines.

8. A bus bar contact stab structure as set forth in claim 7 in which there is a first rolling bend at which the second joining section is connected to said connecting section.

9. A bus bar contact stab structure as set forth in claim 8 in which there is a second rolling bend at which part of the first joining section is connected to said connecting section.

10. A bus bar contact stab structure as set forth in claim 9 in which there is another bend line having a relatively sharp bend at which another part of the first joining section is connected to said connecting section.

* * * * *